Dec. 11, 1962  E. E. GRAY ET AL  3,067,526
TERRAIN RADAR SIMULATION
Filed May 29, 1961  4 Sheets-Sheet 1

INVENTORS
EDWARD E. GRAY
PETER N. SCHINK
ROBERT S. C. YOUNG
BY Edward A. Robinson
ATTORNEY Dec. 11, 1962   E. E. GRAY ET AL   3,067,526
TERRAIN RADAR SIMULATION
Filed May 29, 1961   4 Sheets-Sheet 3

INVENTORS
EDWARD E. GRAY
PETER N. SCHINK
ROBERT S.C. YOUNG

BY Edward A. Robinson
ATTORNEY

Dec. 11, 1962 E. E. GRAY ET AL 3,067,526
TERRAIN RADAR SIMULATION
Filed May 29, 1961 4 Sheets-Sheet 4
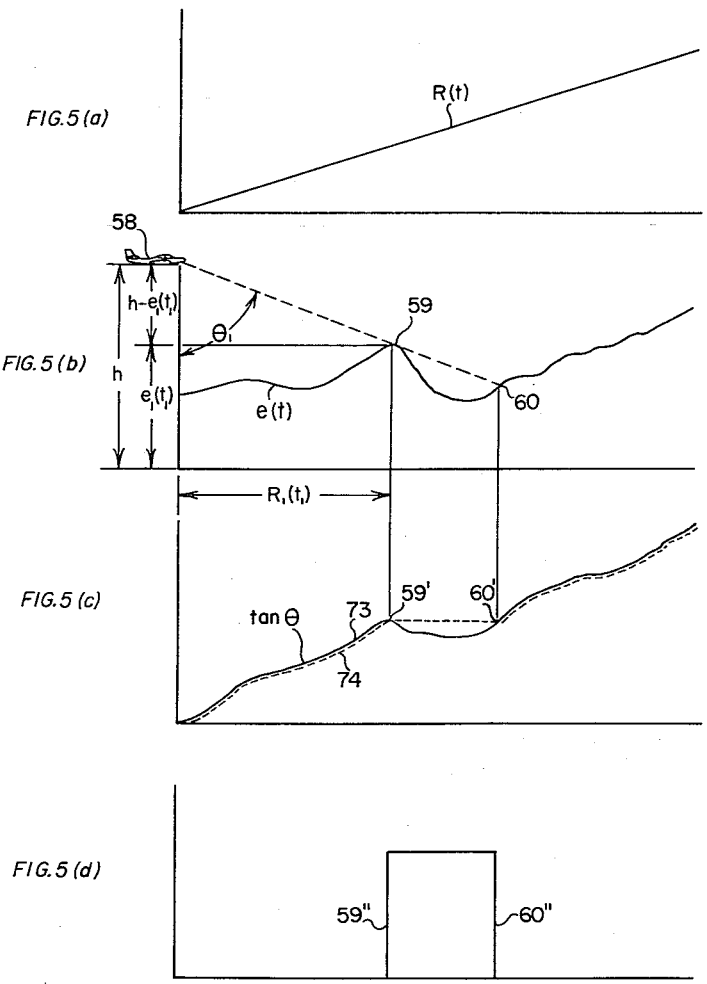
INVENTORS
EDWARD E. GRAY
PETER N. SCHINK
ROBERT S.C. YOUNG
BY Edward A. Robinson
ATTORNEY United States Patent Office 3,067,526
Patented Dec. 11, 1962

3,067,526
TERRAIN RADAR SIMULATION
Edward E. Gray, Mountain View, Peter N. Schink, Menlo Park, and Robert S. C. Young, Palo Alto, Calif., assignors to General Precision, Inc., Binghamton, N.Y., a corporation of Delaware
Filed May 29, 1961, Ser. No. 113,197
2 Claims. (Cl. 35—10.4)

This invention relates to apparatus for training personnel in the operation and observation of radar equipment, and more particularly, this invention relates to apparatus for simulating an airborne radar display of terrain information. This invention is related to inventions disclosed in three co-pending applications for United States Letters Patent assigned to the same assignee as the instant invention. A first application, Serial No. 41,522, entitled "Terrain Radar Simulation" was filed by Edward E. Gray, Thomas P. Pappas and Richard L. Taylor on July 8, 1960. The second co-pending application is Serial No. 41,564, entitled "Radar Simulation," and was filed by Edward E. Gray, Keith E. McFarland, and Kenneth R. Hackett on July 8, 1960, now Patent No. 3,031,774. And the third co-pending application, Serial No. 113,196 entitled "Radar Simulation" was filed concurrently with the instant application by Edward E. Gray and Keith E. McFarland.

Aircraft simulators comprising grounded apparatus are commonly used for the teaching and practicing of aircraft flight, navigation, or the like. Simulators provide a saving in time and apparatus required, and the hazards of airborne teaching are eliminated. An aircraft simulator may comprise generally a unit which represents a portion of an airplane, and has a seat(s) for a student(s) positioned in spaced relation to a set of aircraft controls and an instrument panel having a complement of instruments that simulate the instruments of an aircraft. Training apparatus may include simulation of any equipment which may be normally installed in an aircraft and may include auxiliary apparatus such as radar.

Aircraft radar apparatus ordinarily uses a cathode ray tube, CRT, to display information obtained by return pulses of energy which were initially transmitted from the apparatus and which are reflected back from objects or terrain. In the radar display, an electron beam may scan lines radially from an initial point representing the location of the aircraft itself, and blips or spots representing various objects or targets will appear at radial distances from the initial point corresponding to the range or distance that the actual objects or targets bear with respect to the aircraft. Thus, the radar provides a map-like display with various terrain features and other objects appearing as spots in scaled relation with the aircraft's location. If an aircraft radar scans a large terrain feature such as a mountain, an area behind the mountain may be out of the line of sight of the radar, and therefore, the radar display will have a blank "shadow area" immediately behind the bright area corresponding to the face of the mountain.

It is an object of this invention to provide an improved method and means for simulating a radar display of terrain, and more specifically, it is an object to provide such a display having shadows or blanked areas behind large terrain features such as mountains.

A further object of this invention is to provide improved apparatus for simulating a radar display of terrain wherein elevational information of the terrain is gained by scanning a flat map area, and more specifically it is an object to provide apparatus for computing shadowed areas, and for blanking the display in the areas of shadow. Numerous other objects and advantages will be apparent throughout the progress of the specification which follows. The accompanying drawings illustrate a certain selected embodiment of the invention and the views therein are as follows:

FIGURES 5(a), 5(b), 5(c) and 5(d) are graphical representations of the signals generated by the circuits of this invention.

Figure 2:
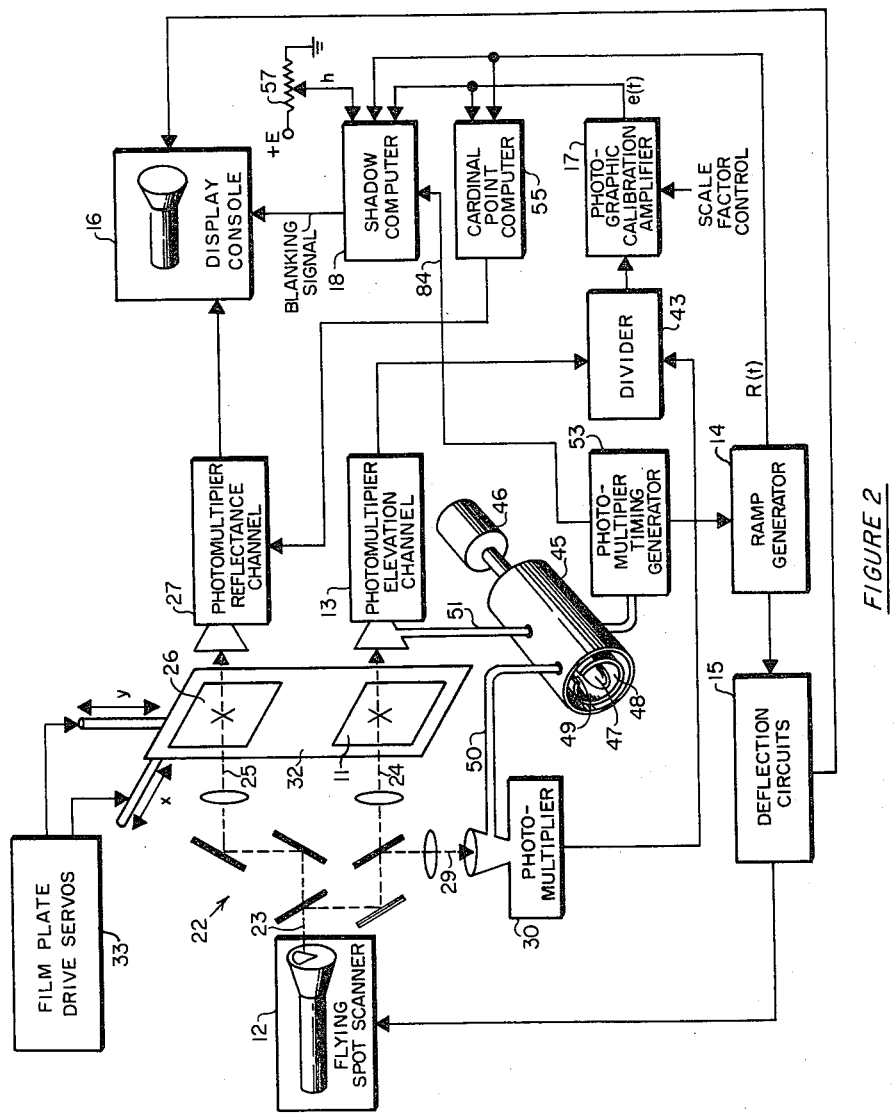
FIGURE 2 is a schematic diagram of a circuit for generating a simulated radar display, and including a means for blanking video signals to establish a shadow effect on the display.

Briefly stated, according to this invention, a map 11 containing contour information represented by various shades of gray is scanned by a flying spot scanner 12, and a photo multiplier 13 develops video signals therefrom (FIGURE 2). A ramp generator 14 provides a saw-tooth wave for deflection circuits 15 which are coupled both to the flying spot scanner 12 and to a CRT display console 16. The video signal from the photo multiplier 13 is passed through circuits including a film calibration amplifier 17 which provides a signal, $e(t)$, representative of the instantaneous elevation of each scanned incremental area, and the ramp generator 14 provides a signal which increases at a constant rate with each scan and corresponds to the instantaneous ground range, $R(t)$, or horizontal distance from the simulated aircraft to the incremental areas being scanned. A shadow computing circuit 18 receives the elevation signal, $e(t)$, and the ground range signal, $R(t)$, together with a constant signal, $h$ representative of the aircraft altitude, and computes an analog signal representative of the tangent function of a simulated radar scanning angle, $\theta$. With each scan, the angle $\theta$ is initially a low value, whereby the tangent of $\theta$ is a correspondingly low value. As the scan progresses, the flying spot moves across the contour map 11, and the angle $\theta$ and the computed tangent thereof generally increase, but at a non-uniform rate. If the scanned contour information includes a high terrain feature such as a mountain, the angle $\theta$ will increase to a maximum at the mountain peak and will then decrease as the far side of the mountain is scanned. A memory device 19 (FIGURE 3) continuously stores the peak value of the analog signal representative of the tangent of $\theta$, and a comparator circuit 20 continuously compares the instant value of the analog signal with the stored peak value. When the analog signal decreases, the stored peak value becomes the greater than the instant value of the analog signal, whereupon a blanking signal is generated by the comparator 20 to blank the video signal which would otherwise be displayed by the console 16.

Figure 1:
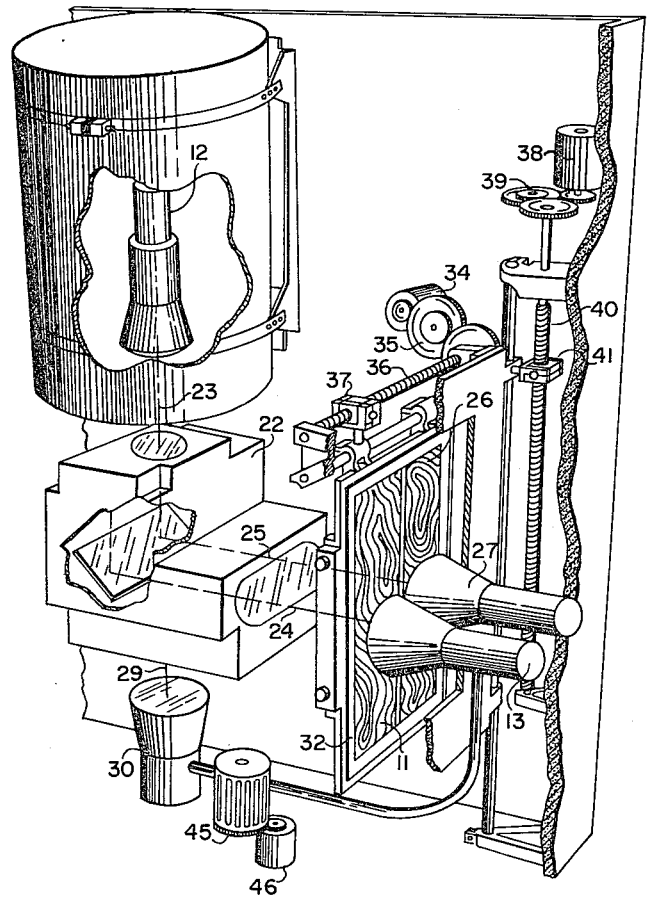
FIGURE 1 is a perspective view of an arrangement for scanning a map to generate a video signal in accordance with this invention.

As shown by FIGURE 1 the flying spot scanner 12 projects a scanning spot upon an optical system 22 which splits an initial beam of light 23 into two beams 24 and 25. The beam 24 passes through the photographic plate 11 having contour information thereon and is received by the photo multiplier 13. The second beam 25 passes through another photographic plate 26 having terrain reflectance information thereon and is received by another photo multiplier 27. Yet another beam of light 29 is focused upon a third photo multiplier 30 without passing through either of the photographic plates 11 or 26.

The photographic plates 11 and 26 may be prepared by a successive stripping technique or process wherein a contour map is photographed, and the photographic emulsion is removed in selected areas between contour lines of the map. The stripping process is alternated with further exposures of the map area upon diapositive transparencies, and further contour elevational areas may be stripped away. If the areas of highest elevation are first stripped from the negative and first exposed on the positive film, the regions of high elevations will be comparative dark, while the regions of low elevation will be comparative light. Thus, the film plates 11 and 26 will contain the map information in various shades of gray representative of both contour information and radar reflectance information. In a preferred embodiment of this invention, the photographic plate was used having 30 distinct shades of gray representing elevations from sea level to 6000 feet. This technique for preparing photographic plates is fully described in a bulletin entitled "Dystrip Technique of Color Separation" by the Aeronautical Chart and Information Center, Air Photographic and Charting Service (MATS).

The film plates 11 and 26 are mounted side by side on a single carriage 32 which is capable of two dimensional, X—Y movement (FIGURE 1). As the simulated aircraft moves, the film plates are moved by servo mechanism drives 33. As shown in FIGURE 1, the X drive may include a motor 34 coupled through a gear chain 35 to a lead screw 36. As the lead screw 36 rotates, a lead nut 37 is caused to move horizontally along the lead screw 36, and the carriage 32 is likewise shifted horizontally. The Y drive may include a motor 38 coupled through a gear chain 39 to rotate another lead screw 40. As the lead screw 40 rotates, a lead nut 41 is moved vertically therealong and the carriage 32 is likewise moved vertically. Thus, the simulated aircraft can move in two dimensions across the map area.

The intensity of the spot of light of the flying spot scanner 12 may vary considerably because of non-uniformity of a phosphor layer therein or because of variations of the response characteristics of various phosphors in that layer. The photo multiplier 30 is positioned to continuously monitor the intensity of the beam 29 which corresponds directly with the intensity of the scanning spot, and the output from the photo multiplier 30 is passed to an analog divider circuit 43 (see FIGURE 2). The analog dividing circuit 43 receives and corrects the video signal from the photo multiplier 13 to provide an output video signal which is not dependent upon the instantaneous intensity of the scanning spot and which is not subject to the variations thereof. The film calibration amplifier 17 is essentially an operational amplifier having certain non-linear characteristics which complement non-linearities in the photographic processing of the plate 11, commonly known as the H and D correction for the photographic process. The video signal passed from the film calibration amplifier 17 to the shadow computer 18 is corrected for both variations in the intensity of the scanning spot and photographic non-linearities of the film plate 11. A full description of photographic film or plate scanning and correction for non-linearities therein is provided in the co-pending patent applications, Serial No. 41,522 and Serial No. 41,564, supra.

The photo multipliers 13 and 30 are subject to drift variations which may result in further inaccuracy in the video signal. These photo multipliers are calibrated between each scanning operation by a light chopper arrangement 45 driven by a synchronous motor 46. A light source 47 is positioned within a rotating cylinder 48 having a peripheral slit or aperture 49. Each time the aperture 49 comes into alignment with a pair of light pipes or lucite rods 50 and 51 (during retrace intervals), a standard light source is applied to calibrate the photo multipliers 13 and 30. A more complete description of this calibration of the photo multipliers appears in the co-pending application, Serial No. 41,522, supra.

The light chopper 45 is coupled to a timing pulse generator 53 which furnishes timing signals to the apparatus of this invention. Thus, it may be appreciated that all of the circuits herein described are timed in accordance with the light chopper 45 which is driven by the synchronous motor 46.

The corrected elevation signal $e(t)$ is passed to the shadow computer 18 and to a cardinal point computer 55. The shadow computer 18 provides a selective blanking for the video signals from the reflectance channel 27 to represent the shadow behind a terrain feature such as a mountain in accordance with the present invention. The cardinal point computer modifies the gain of video signals from the reflectance channel 27 in accordance with a computed angle of incidence between simulated radar line of sight and the incremental areas of the terrain. The structure of the cardinal point computer 55 is disclosed and claimed in the co-pending patent application Serial No. 113,196, supra. Thus, the viedo signal obtained from the photo multiplier 27 containing reflectance data from the photographic plate 26 is modified by both the shadow computer 18 and the cardinal point computer 25, and the modified video signal is passed to the display console 16 providing a simulated radar display of terrain represented by the maps on the photographic plates 11 and 26. While the shadow computer 18 will cause selective blanking of the video signals from the photo multiplier 27, the cardinal point computer 55 will increase or decrease the gain of the video amplifier associated with the photo multiplier 27.

Since the output from the elevation channel or photo multiplier 13 is used in analog computations, the video signals from this channel were corrected for both variations in brightness of the flying spot scanner, for drift variations from the photo multiplier circuits, and for photographic non-linearities, but since the output from the photo multiplier 27 is not used in computations, the video signals therefrom may be passed to the display console 16 being modified only by the shadow computer and cardinal point computer. The photographic plate 11 may include 30 discrete shades of gray such that the elevation signal $e(t)$ may have sufficient accuracy to provide a basis for analog computations in the shadow computer 18 and the cardinal point computer 55. On the other hand, the photographic plate 26 contains radar reflectance data corresponding to the intensity of radar returns from various terrains encountered. The reflectance data thus obtained will be displayed for visual observation on the console 16, and because the human eye is incapable of distinguishing many variations in brightness, a satisfactory signal may be obtained using only 5 discrete shades of gray for the film plate 26.

Figure 3:
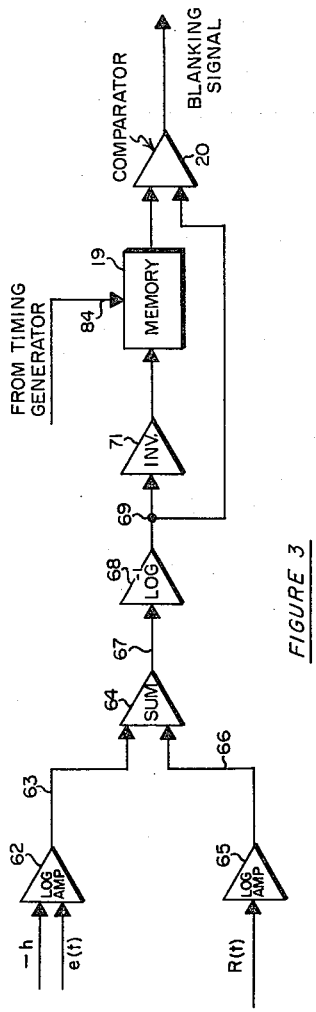
FIGURE 3 is a schematic diagram of shadow computing apparatus which was shown as a block in FIGURE 1.

The shadow computer 18 may be considered in greater detail with reference to FIGURE 3. Three analog input signals are passed to the shadow computer: (1) a linear saw-tooth wave or ramp from the ramp generator 14 representative of the instantaneous ground range, $R(t)$, or horizontal distance from the position of the simulated aircraft; (2) the elevation signal, $e(t)$, derived from the photo multiplier 13; and (3) an altitude signal, $h$, representative of the altitude of the simulated aircraft above sea level. For any particular scanning operation, the value of the altitude signal, $h$, may be considered constant and is derived from a voltage source such as a potentiometer 57 (FIGURE 2) which is set in accordance with the assumed altitude of the simulated aircraft.

FIGURE 5(b) illustrates the geometry underlying the shadow computer computations. The simulated aircraft 58 is at a constant altitude, $h$, above sea level while the terrain features (of a particular scan) are represented by the analog signal, $e(t)$, shown as the solid line curve. The angle $\theta$ represents the angle subtended by the simulated radar line of sight from the aircraft position 58. As the scanning of the elevation channel derives the function, $e(t)$, the angle $\theta$ first increases (non-linerally) to a point 59 representative of a mountain peak. Beyond the point 59, the angle $\theta$ will decrease as the far side of the mountain is traced. The area between the point 59 and a point 60 lies in the shadow of the mountain and would be hidden from the radar of an aircraft. Therefore, it is desirable that the simulated radar be blanked to prevent any display of the area between the points 59 and 60. As the scan continues beyond point 60 the angle θ continues to increase, and therefore, the video signals will again pass to the console 16 and be displayed.

Obviously, it is desirable to interrupt or blank the video signal whenever the angle θ decreases in value below any previous peak value thereof. The angle θ is not computed by the shadow computer, but the trigonometrical tangent function of the angle θ may be computed and since the tangent of the angle θ will vary similarly to the value of the angle itself, the video blanking signals may be developed therefrom. This is possible since the tangent function will increase without discontinuity as the angle increases from 0° to a limit somewhat less than 90°. The shadow computer derives the tangent function in accordance with the formula:

$$\tan \theta = \frac{R(t)}{h - e(t)}$$

Thus in the computation of the tangent function the ground elevation value, $e(t)$, is subtracted from the aircraft altitude value of $h$, and the difference is divided into $R(t)$. From FIGURE 5(b) it may be appreciated that the quantity $[(h - e(t))]$ equals the vertical height of the simulated aircraft 58 over the terrain points and is the adjacent side of a right triangle, whereas the quantity, $R(t)$, is the side opposite the angle θ.

In FIGURE 3, an operational amplifier 62 sums analog signals representing the negative value of the altitude, $h$, with the positive value of $e(t)$ to obtain the difference thereof. The operational amplifier 62 may include a diode function generator as a feedback network to provide non-linear output characteristics for the amplifier, such that the output of the amplifier will be an analog signal corresponding to the logarithm of the difference of the two input quantities, $h$ and $e(t)$. This analog signal will appear on a lead 63 which is applied to a summing amplifier 64. In a similar manner, the ramp function, $R(t)$, is applied to the input of a similar non-linear amplifier 65 to obtain a function representative of the logarithm of the quantity, $R(t)$, and this analog signal is applied via a lead 66 to the summing amplifier 64. Non-linear amplifiers with diode function generator arrangements have been used heretofore in the analog computer art, and one such arrangement which would be suitable for the amplifiers 62 and 65 is disclosed on page 295 of a textbook entitled "Electronic Analog Computers" by Korn and Korn, published by the McGraw-Hill Book Company, second edition, 1956. By careful construction and choice of quality components, the diode function generators and amplifiers can be made to operate at a one megacycle rate. The summing amplifier 64 is a linear amplifier and may be of the type disclosed in FIGURE 1.5(d) on page 13 of the Korn and Korn book, supra.

The summing amplifier 64 effectively subtracts the quantity, log $[h - e(t)]$ from the quantity, log $R(t)$. The analog signal appearing on a lead 67 is the difference between the two logarithmic quantities which constitutes the logarithm of the quotient of the two quantities. Thus, the analog signal appearing on the lead 67 will be $$\log R(t) - \log [h - e(t)] = \log \frac{R(t)}{h - e(t)} = \log \tan \theta$$

The analog signal on the lead 67 corresponding with the log tan θ may be applied to another non-linear amplifier 68 having a diode function network such that the output signal which will appear at a point 69 will correspond with the antilogarithm of the input quantity, and therefore, the analog signal appearing at the point 69 corresponds to the tangent of the angle θ.

It may be noted that the linear function shown in FIGURE 5(a) is that generated by the ramp function generator 14 and corresponds with the ground range, $R(t)$, which is the instantaneous horizontal distance from the simulated aircraft 58. The function represented by the solid line of FIGURE 5(b) corresponds with the elevation signal $e(t)$. The function illustrated by the solid line of FIGURE 5(c) corresponds with the ground range $R(t)$ divided by the quantity $[h - e(t)]$ which constitutes the height of the aircraft above the terrain. Therefore, the solid line of FIGURE 5(c) corresponds with the tangent function of θ which is the ratio between the functions shown in FIGURE 5(a) and that shown in FIGURE 5(b). As shown in FIGURE 5(c), the tangent function of θ increases non-linearly from 0 at the origin to a finite value at the limit of the scan. However, the value of the function may become less than its previous peak value, as in the shadow area between points 59' and 60'. It may be appreciated that from a study of FIGURES 5(b) and 5(c) that when the tangent of θ becomes less than its previous peak value, that a shadow area is required in the simulated radar display of the terrain, and therefore, a blanking signal should be developed.

With further reference to FIGURE 3 it may be noted that the analog signal appearing at point 69 and corresponding with the tangent of θ is impressed on an amplifier 71 which constitutes an inverting circuit. The amplifier 71 may be a single stage linear operational amplifier wherein the output signal will be the negative of the input signal. The output signal from the amplifier 71 is applied to a memory device 19 which continuously stores the peak value therefrom. Thus, during times when the tangent signal continuously increases, the value stored in the memory circuit 19 will be slightly less than the input thereto, but should the input decrease in value the memory circuit 19 will retain the voltage of the previous peak value.

The circuit 20 compares the analog signal corresponding to the tangent of θ from the point 69 with the negative peak value of the signal. Thus, while the signal continuously increases, the value at point 69 will always be slightly greater than the stored peak value in the memory 19, however, if the analog signal of point 69 decreases in value, the signal from the memory circuit 19 will be the greater, and at such times the comparator circuit 20 will generate a blanking signal to be impressed upon the video channel of the photo multiplier 27 (FIGURE 2).

FIGURES 5(c) and 5(d) illustrate the operation of the peak value memory and comparator circuits. The curve 73 shown as a solid line in FIGURE 5(c) traces the analog signal representative of the tangent of θ and the curve 74 shown as a dashed line traces the peak value that is stored in the memory circuit 19. It may be noted that initially the dashed curve 74 follows very closely to the ascending portion of the curve 73, but when a point 59' is reached the curve 73 representative of the tangent function decreases in value, whereupon the dashed curve 74 remains at a constant level representative of the previous peak value of the curve 73. Subsequently, the tangent function curve 73 again increases in value, and at a point 60' will become equal to the previous peak value of point 59'. As the tangent curve 73 continues to rise from the point 60', the peak value curve 74 will again follow closely and conform to the function curve 73.

Obviously, further mountain ranges or other terrain features derived from the map 11 could require further shadow areas to appear on the display, and in such event the tangent function 73 could have further peak values followed by dips which would result in further blanking signals. The output signal from the comparator 20 is represented by the curve of FIGURE 5(d). This curve remains at substantially a zero value until the peak value curve 74 exceeds the function curve 73, FIGURE 5(c), whereupon the blanking signal is developed as a square wave. The leading edge of the blanking signal 59'' corresponds with the crossover point 59' of the curves in FIGURE 5(c), and the trailing edge 60'' corresponds with the second crossover point 60' of the curves of FIGURE 5(c).

Figure 4:
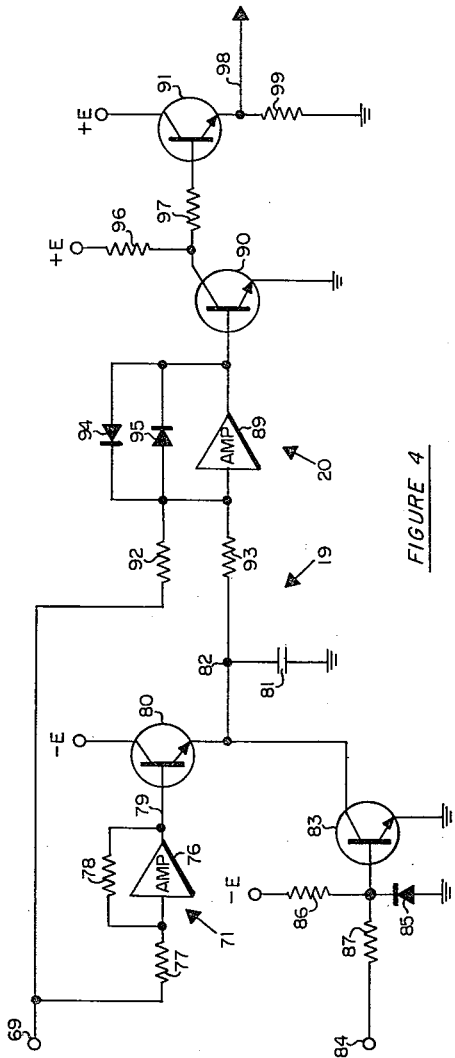
FIGURE 4 is a detailed schematic diagram of a portion of FIGURE 3 which was illustrated in blocks.

FIGURE 4 discloses in greater detail the structure of FIGURE 3 which was shown by the blocks 71, 19 and 20 in FIGURE 3. The analog signal representative of the tangent function of the subtended angle of the radar line of sight, tan $\theta$, is impressed upon the input lead 69. The inverter 71 comprises an operational amplifier 76 together with an input resistor 77 and a feedback resistor 78. As indicated previously, the operational amplifier may be of a conventional type and functions merely to provide a signal at a point 79 which is the negative of the analog signal impressed upon the point 69.

A transistor 80 and a capacitor 81 constitute the memory device 19. A further transistor 83 is rendered non-conductive during the scanning intervals, and therefore, the capacitor 81 will accumulate charge from the transistor 80 which is biased by the inverse analog signal at the point 79. The capacitor 81 is initially discharged, and during each scanning interval the transistor 80 conducts during those times when the signal at the point 79 exceeds the emitter bias at the point 82. During these times when the transistor 80 is conductive, the voltage at a point 82 will become equal to the voltage at the point 79 but for the slight drop against the transistor 80, and the capacitor 81 will be charged accordingly. However, if the analog signal at the input terminal 69 decreases in value, the inverse signal at the point 79 will likewise decrease in value, and the transistor 80 will be rendered non-conductive. The voltage at the point 82 will be maintained by the capacitor 81 and will therefore be substantially equal to the previous peak voltage at the point 79. Thus, the signal at the point 82 will correspond with the curve 74, FIGURE 5(c), and will closely follow the inverse of the analog signal at the point 69 while that signal is increasing but will remain constant when the analog signal decreases below a previous peak.

From the foregoing it will be appreciated that the analog signals 73 and 74 shown by FIGURE 5(c) will be opposite in polarity to each other. The results from the operation of the inverter 71 as heretofore described, and this makes possible a simple method for comparing the two signals by summation thereof as will be described subsequently. In FIGURE 5(c) the curves 73 and 74 lie together, and the reversal of polarity is disregarded to provide greater ease in understanding this invention.

A second input terminal 84 is coupled to the timing generator 53 (FIGURE 2) to receive positive voltage pulses during retrace intervals between successive scans. Ordinarily, a diode 85 connected in series with a resistor 86 between a point of ground potential and a negative reference voltage will conduct and will bias the base electrode of the transistor 83 slightly negative of ground potential by the amount of the voltage drop across the diode 85. This slightly negative bias will render the transistor 83 non-conductive. When a positive pulse from the timing generator 53 is passed via the lead 84 and an input resistor 87 to the base electrode, the transistor 83 is rendered conductive, and the potential of the point 82 is reduced to substantial ground potential discharging the capacitor 81. Thus, during each retrace interval the capacitor 81 is discharged in preparation for the next subsequent scanning interval.

The comparator circuit 20 includes an amplifier 89 followed by a transistor 90 connected as a further amplifying stage and another transistor 91 connected as an emitter follower. The analog function signal from the input terminal 69 is impressed upon the summing junction of the amplifier 89 by an input resistor 92, and the inverse peak of the analog signal appearing at the point 82 is impressed upon the summing junction by a resistor 93. Since the two input signals to the amplifier 89 are opposite in polarity, the summing point may be either slightly positive or negative depending upon the relative magnitudes of the two signals. If the signal at the point 69 is greater than the signal at the point 82, the voltage at the summing point of the amplifier 89 will be positive. Since the amplifier 89 will have a high gain, the output voltage therefrom will be substantially negative when the input voltage is slightly positive.

A pair of diodes 94 and 95 are connected as feedback paths for the amplifier 89 and function to limit the output voltage of the amplifier. Thus, if the output tends to be substantially positive the diode 94 will conduct, and if the output is substantially negative the diode 95 will conduct. The output from the amplifier 89 is thus held between voltage limits corresponding with the voltage drops across the diodes 94 and 95. Such voltage drops would ordinarily be of the order of ½ volt, and therefore, the output from the amplifier 89 may be negative ½ volt, or positive ½ volt depending upon which of the input signals is the greater.

The ½ volt positive or negative output from the amplifier 89 is amplified substantially by the transistor amplifier 90. Thus, if the voltage impressed upon the base electrode of the transistor 90 is negative the transistor will conduct and the voltage drop across a load resistor 96 will cause the voltage of the collector electrode to become less positive. This voltage is coupled through a resistor 97 to the base electrode of the transistor 91 whereby the transistor 91 remains cut-off and the output signal at a terminal 98 will be at substantially ground potential. On the other hand, if the biasing of the transistor 90 is reversed, the transistor 90 will be cut-off whereupon the emitter follower 91 will conduct causing the substantial voltage drop across a load resistor 99 such that a positive blanking signal will result at the terminal 98.

The method and apparatus heretofore described will provide the blanking of a video signal when the tangent function of the subtended angle $\theta$ decreases below a previous peak value thereof. Obviously, the same result could be obtained if an analog signal directly proportional to the angle $\theta$ were generated, since a blanking signal must be generated whenever the angle $\theta$ itself becomes less than any previous peak value thereof during a single scan. The method of this invention could be performed upon any function of the angle $\theta$ which increases (or decreases) without discontinuity as the angle $\theta$ increases from zero to 90°. One other such function of the angle $\theta$ is the logarithm of the tangent thereof. Since the log tan $\theta$ will increase without discontinuity as the angle $\theta$ increases, this function would meet the requirements specified above. This fact leads to a possible simplification of the apparatus of this invention. From the previous discussion in connection with FIGURE 3, it was seen that the analog signal appearing on a lead 67 at the input of the amplifier 68 was representative of the log tan $\theta$, and therefore, it would be possible to eliminate the amplifier 68 which effectively derives the tangent function from the log tangent function.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for simulating an aircraft radar display of terrain, said apparatus comprising a first map of the terrain having radar reflectance information thereon, a means for scanning the first map to generate a video signal, a second map of the terrain having elevational information thereon, a means for scanning the second map to generate a first analog signal corresponding to the elevation of the terrain, a means for generating a second analog signal corresponding to the altitude of the simulated aircraft above sea level, a non-linear amplifier coupled to receive the first and the second analog signals and operable to generate a third analog signal corresponding to the logarithm of the quantity representative of the height of the simulated aircraft above the terrain, a means for generating a fourth analog signal which varies linearly with respect to each scanning time and corresponds to the horizontal distance between the simulated aircraft and the terrain being scanned, another non-linear amplifier coupled to receive the fourth analog signal and operable to generate a fifth analog signal corresponding to the logarithm thereof, a summing amplifier coupled to receive the third and fifth analog signals and operable to generate a sixth analog signal corresponding to the logarithm of the tangent of an angle subtended by the simulated line of sight of the radar, another non-linear amplifier coupled to receive the sixth analog signal and operable to generate a seventh analog signal which is the antilogarithm of the sixth analog signal and corresponds to the tangent function of the subtended angle, a memory means coupled to receive the seventh analog signal and to store the peak value thereof during each scanning time, a comparison means coupled to the seventh analog signal and to the memory means and operable to generate a blanking signal whenever the seventh analog signal becomes less than a previous peak value thereof during any scanning time, and a display means for receiving the video signal and generating a visual display therefrom, said blanking signal being operable to blank the video signal and to create a shadow area on the visual display whenever the seventh analog signal is less than a previous peak value thereof.

2. Apparatus for simulating a radar display of terrain, said apparatus comprising a first map of the terrain having radar reflectance information stored thereon photographically in shades of gray, means for scanning the first map to generate a video signal, a second map of the terrain having elevational information stored photographically thereon in shades of gray, means for scanning the second map to generate a first analog signal corresponding with the shades of gray and the elevation of the terrain, computing means coupled to receive the first analog signal and operable to generate a second analog signal corresponding to the tangent function of an angle subtended by the line of sight of the simulated radar, memory means coupled to receive the second analog signal and operable to store the peak value thereof, said memory means including an inverting amplifier for receiving the second analog signal and for generating a third analog signal which will be the negative of the second analog signal, said memory means further including a transistor coupled to the inverting amplifier and a capacitor coupled to the transistor for storing a charge representative of the peak value of the third analog signal, said transistor being operable to conduct during times when the third analog signal is increasing and being operable to isolate the capacitor during times when the third analog signal decreases to a value less than a previous peak value thereof, and a discharge means coupled to the capacitor and operable to discharge the capacitor during intervals between successive scans of the scanning means, comparison means coupled to receive the second analog signal and the stored peak value of the third analog signal from the capacitor for generating a blanking signal when the stored peak value exceeds the value of the second analog signal, and a display means coupled to receive the video signal and to generate a visual display therefrom, said blanking signal being coupled to blank the video signal and cause a shadow area to appear on the visual display when the stored peak value of the third analog signal exceeds the second analog signal.

References Cited in the file of this patent

UNITED STATES PATENTS

| | | |
|---|---|---|
| 2,737,730 | Spencer | Mar. 13, 1956 |
| 2,788,588 | Lindley | Apr. 16, 1957 |